United States Patent
Miyoshi

[11] Patent Number: 6,116,106
[45] Date of Patent: Sep. 12, 2000

[54] ROTATION-RECIPROCATION CONVERTING ROTOR

[75] Inventor: Sotsuo Miyoshi, Tokyo, Japan

[73] Assignee: Mitsubishi Denki Kabushiki Kaisha, Tokyo, Japan

[21] Appl. No.: 09/198,366

[22] Filed: Nov. 24, 1998

Related U.S. Application Data

[62] Division of application No. 08/882,039, Jun. 25, 1997, abandoned.

[30] Foreign Application Priority Data

Jan. 28, 1997 [JP] Japan ......................................... 9-14332

[51] Int. Cl.⁷ .............................. H02K 7/06; F16K 31/04; F16K 31/10; F02M 25/07
[52] U.S. Cl. .................................. 74/424.8 VA; 74/89.15; 74/424.8 R
[58] Field of Search ........................... 74/89.15, 424.8 R, 74/424.8 VA; 310/80

[56] References Cited

U.S. PATENT DOCUMENTS

| | | | |
|---|---|---|---|
| 2,857,776 | 10/1958 | Williams et al. | 74/424.8 R |
| 2,860,266 | 11/1958 | Schrader | 74/424.8 VA |
| 2,930,571 | 3/1960 | Vogi | 74/424.8 VA |
| 4,553,056 | 11/1985 | Pfister | 74/89.15 |
| 4,712,440 | 12/1987 | Rousselot | 74/424.8 VA |
| 4,915,083 | 4/1990 | Hewette et al. | 251/129.11 |
| 5,351,935 | 10/1994 | Miyoshi et al. | 251/129.12 |
| 5,680,880 | 10/1997 | Miyake et al. | 251/129.11 |
| 5,784,922 | 7/1998 | Ozaki et al. | 74/424.8 VA |

FOREIGN PATENT DOCUMENTS

| | | |
|---|---|---|
| 19528735 | 2/1996 | Germany . |
| 7-27023 | 1/1995 | Japan . |
| 8-49782 | 2/1996 | Japan . |

*Primary Examiner*—David A. Bucci
*Assistant Examiner*—William C Joyce
*Attorney, Agent, or Firm*—Sughrue, Mion, Zinn, Macpeak & Seas, PLLC

[57] ABSTRACT

A rotation-reciprocation converting motor comprises: a rotor (32) which is rotatable in a forward direction and in a reverse direction; and a motor shaft (33) which is slidably guided by a bushing (41), and which is engaged with the rotor (32) to convert the rotating motion of the rotor into a reciprocating motion. The motor shaft (33) includes: a threaded portion (33a) which is engaged with the rotor; and the rotation regulating portion (33b) which is fitted in a bushing (41), the rotation regulating portion (33b) having an abutting portion (33c) which is abutted against a rotational position determining stopper portion (32b) which is formed at an end of the rotor. This feature makes it possible to reduce the number of portions which should be high in accuracy from three to two, which contributes to an improvement in accuracy of the motor.

2 Claims, 6 Drawing Sheets

ROTATION-RECIPROCATION CONVERTING ROTOR

This is a divisional of application Ser. No. 08/882,039 filed Jun. 25, 1997now abandoned, the disclosure of which is incorporated herein by reference.

BACKGROUND OF THE INVENTION

This invention relates to a rotation-reciprocation converting motor incorporating a mechanism which converts the rotating operation of an electric motor to a reciprocating operation.

An electric motor of this type has been disclosed, for instance, by Unexamined Japanese Patent Publication 7-27023. FIG. 10 shows the internal structure of a stepper-motor-driven exhaust gas re-circulation control valve which is a motor-driven control device employing a stepper motor. In FIG. 10, a housing 1 has an input port 2 communicated with the exhaust system of an engine, an output port 3 communicated with the suction system of the engine, circulating passageways 4a and 4b, and a water-cooling type passageway 14. A valve seat 6 is press-fitted in the circulating passageway 4a, and fixed with a roll pin 13. Reference numeral 9 designates a bushing serving as a bearing. Reference numeral 8 designates a holder to prevent the entrance of deposits into the bushing 9. The holder 8 is held between the housing 1 and the bushing 9 in such a manner that it is coaxial with the valve seat 6. Reference numeral 5 denotes a valve which is so arranged as to abut against the valve seat. The valve 5 is secured to one end of a valve shaft 7 by caulking. The valve shaft 7 penetrates the bushing 9. A spring holder 10 and a spring washer are secured to the other end of the valve shaft 7 by caulking. Reference numeral 12 designates a spring. The spring 12 is held between the spring holder 10 and the housing 1 to close the valve 5.

Further in FIG. 10, reference numeral 20 designates a stepper motor body. The stepper motor body 20 is coupled to the housing 1 with screws 46 in such a manner that the former 20 is coaxial with the latter 1. Reference numeral 22 designates a bobbin on which a coil 23 is wound. The coil 23 is surrounded by a yoke 24 and a yoke 25. Reference numeral 29 designates a terminal which is electrically connected to the coil 23. The terminal 29 and a motor housing 21 form a connector section. Reference numeral 27 denotes a plate which magnetically shields the two coil sections from each other. Reference numeral 26 designates a plate which prevents resin from flowing into the coil sections when the motor housing 21 is formed by molding. Reference numeral 31 designates a magnet. Reference numeral 32 denotes a rotor which holds the magnet 31, and has a threaded portion 32a in the inner cylindrical surface which is engaged with a threaded portion of a motor shaft 33, and an axial direction stopper 32b for the motor shaft 33. Reference numeral 30 designates bearings set at both ends of the rotor 32. Reference numeral 28 designates a leaf spring for pressing the bearings sidewards. Reference numeral 33 designates the aforementioned motor shaft which has the threaded portion 33a. The threaded portion 33a is engaged with the threaded portion 32a, to convert the rotating motion of the rotor 32 into a linear motion. Reference numeral 34 designates a stopper pin press-fitted in the motor shaft. Reference numeral 41 denotes a bushing which serves as a bearing and is prevented from rotation by means of a hole D-shaped in section. Reference numeral 40 designates a motor holder arranged between the motor housing 21 and the housing 1 in such a manner that it is coaxial with the motor housing 21 and supports the bearing 30 and the motor bushing 41.

The conventional motor designed as described above operates as follows:

In a valve opening operation, a control unit (not shown) applies a pulse voltage to the terminal 29. In response to the voltage, the rotor 31 including the magnet 31 performs a valve opening rotation stepwise. In this operation, the number of signal transmission pulses is equal to the number of steps; that is, an open loop control is carried out accurately. This stepwise rotation is transmitted to the motor shaft 33 through the threaded portion 32a of the rotor 32 and the threaded portion of the motor shaft 33. The motor shaft is regulated in movement in the direction of rotation by a so-called "D-portion" semi-circular in section and the D hole of the bushing 41. Therefore, the rotating motion of the rotor 32 is converted into a linear motion, so that the motor shaft is moved in a valve opening direction (downwardly in FIG. 10).

The rotation-reciprocation converting motor is a stepper motor based on the open loop control. Before the controlling of the motor shaft, it is necessary to perform an initializing operation so that the zero position of the motor is obtained, and with the zero position as a reference, the initial phase of the control unit is made coincident with the initial phase of the motor. That is, the zero position should be determined when the motor shaft is fully contracted or expanded. More specifically, the position is determined as the zero position where the stopper pin 34 abuts against the stopper portion when the motor shaft is fully contracted. Accordingly, in the initializing operation, valve closing signals more than all the number of steps are applied to the motor; that is, by stopping the driving of the motor at the phase which is the same as the phase that the motor shaft is mechanically fully contracted, the control unit is made in phase with the motor.

In the initializing operation, the stopper pin 34 secured to the motor shaft 33, and the rotation regulating D portion 33b of the motor shaft 33 must be in phase in order to perform the initializing operation accurately and to reduce the operating sound in the initializing operation. Further the yoke 24 and the yoke 25 of the motor, the motor bushing 41, the magnet 32a, the threaded portion 31a of the rotor 32, and the stopper portion 32 b of the rotor 32 must also be in phase with one another when positioned in the initializing operation. Furthermore, after the initializing operation, in order to make the amount of protrusion of the shaft 33 in the direction of axis constant, both the phase of the threaded portion 33a of the motor shaft 33, and the phase of the rotation preventing D portion 33b must be made constant.

As conducive to a full understanding of the invention, it is essential to correctly understand the term "phase" as used herein. The term "phase" will be described with reference to FIG. 11 which indicates phase relations between the threaded portion 33a and the rotation regulating portion 33 of the motor shaft 33. In FIG. 11, reference numeral 60 designates a portion where the operation of cutting the threads is started (hereinafter referred to as "a thread start portion" when applicable); 61, a subsidiary line indicating the angular position of the thread start portion 60; and 62, a subsidiary line indicating the central axis of the rotation regulating portion 33b.

In FIG. 11, in order to set the length of the threaded portion 33a to A, the thread start portion 60 is located at a distance A from the right end of the motor shaft 33. In this connection, it should be noted that, the thread start portion 60 may be located at the distance A; however, the threaded start portion 60 cannot be at any position on the cylindrical surface of the motor shaft 33. That is, if it is assumed that the phase is 0° in the case where the thread starts at the position of the subsidiary line 61 (the subsidiary lines 62 and 61 coincide with each other), then in the case where the cutting of the thread is started from an angular position α with respect to the subsidiary line 62 (from the position below the latter 62 in FIG. 11), the phase is α°.

As the rotor 32 is turned around the motor shaft 33, the latter 33 is moved horizontally (right and left) in FIG. 11. In this case, the position of the motor shaft 33 with respect to the angle of rotation of the rotor differs as much as one pitch in maximum depending on the phase of the thread start position. Hence, in order to accurately control the position of the shaft 33 according to the angle of rotation of the rotor 32, the above-described phase should not fluctuate from one product to the next. Although the relation between the threaded portion 33a and the rotation regulating portion 33b has been described, the same thing can be said about other parts.

With the motor thus constructed, in order to accurately achieve the initializing operation, the stopper pin 34, the rotation regulating portion, namely, the D portion 33b, and threaded portion 33a should be coincident in relative positional relation, i.e., in phase with one another. The accurate coincidence of those parts depends on the accuracy of the stopper pin, the accuracy in the press-fitting of the stopper pin into the motor shaft, and the accuracy in positional relation between the threaded portion and the rotation regulating portion. Hence, those parts cannot be adjusted without a number of manufacturing steps. This is not economical. Furthermore, since the stopper pin is press-fitted in the shaft, the former may come off the later. In addition, the stopper pin is; in general, circular in section. Hence, the stopper pin is smaller in its area of abutment against the stopper portion 32b, and therefore the stopper portion 31b is worn out during use, which may result in a small phase shift.

SUMMARY OF THE INVENTION

In view of the foregoing, an object of the invention is to eliminate the above-described difficulties accompanying a conventional rotation-reciprocation converting motor. More specifically, an object of the invention is to provide a rotation-reciprocation converting motor in which, the stopper pin is not employed, and instead the motor shaft has the rotation regulating portion which has the same function as the stopper pin, whereby the adjustment of phase can be achieved more readily.

The foregoing object of the invention has been achieved by the provision of a rotation-reciprocation converting motor comprising: a rotor which is rotatable in a forward direction and in a reverse direction; and a motor shaft which is slidably guided by a bushing, and which is engaged with the rotor to convert the rotating motion of the rotor into a reciprocating motion, in which, according to the invention, the motor shaft includes: a threaded portion which is engaged with the rotor; and a rotation regulating portion which is slidably guided by a bushing which is integral with the threaded portion, the rotation regulating portion having an abutting portion which is abutted against a rotational position determining stopper portion which is formed at the end of the rotor.

In the motor, the motor shaft is formed by a metal injection molding method, and the rotation regulating portion thereof has a core portion which is equal in diameter to the outside diameter of the threaded portion.

In the motor, the threaded portion of the motor shaft is formed by a rolling molding method, and the rotation regulating portion is formed at one end of the threaded portion by insert molding.

Furthermore, in the motor, the rotation regulating portion is of resin.

Moreover, in the motor, the threaded portion of the motor shaft is formed by a metal plastic working method, and the rotation regulating portion is formed by a metal injection molding method, the rotation regulating portion being welded to one end of the threaded portion.

In addition, in the motor, the rotation regulating portion has an abutting portion whose flat surface is abutted against a flat surface of a stopper portion provided on the side of the rotor.

DESCRIPTION OF PREFERRED EMBODIMENTS OF THE INVENTION

First Embodiment

Figure 1:
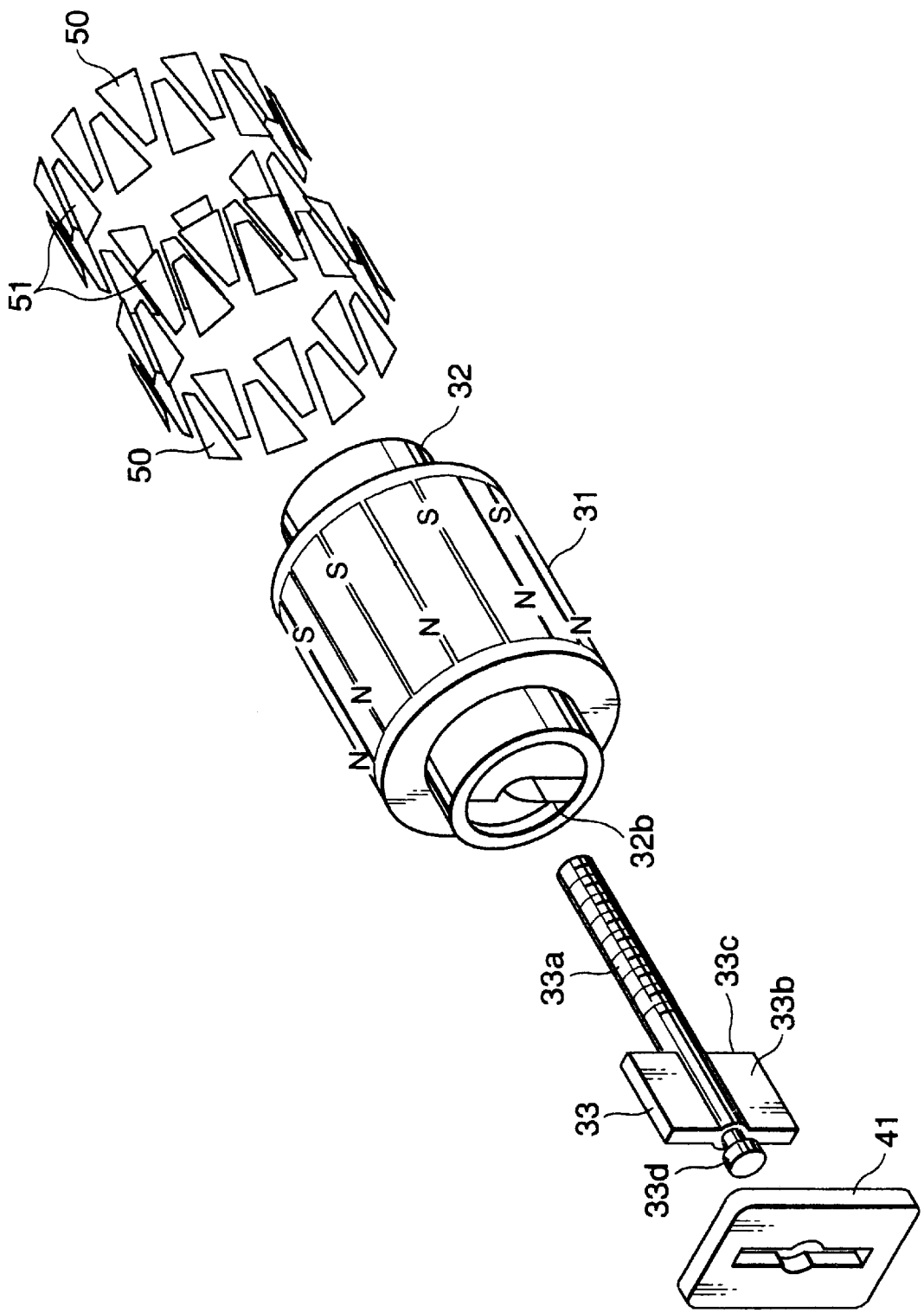
FIG. 1 is an exploded perspective view showing essential components of an example of a rotation-reciprocation converting motor, which constitutes a first embodiment of the invention.

FIG. 1 is an exploded perspective view showing essential components of an example of a rotation-reciprocation converting motor, which constitutes a first embodiment of the invention.

Figure 10:
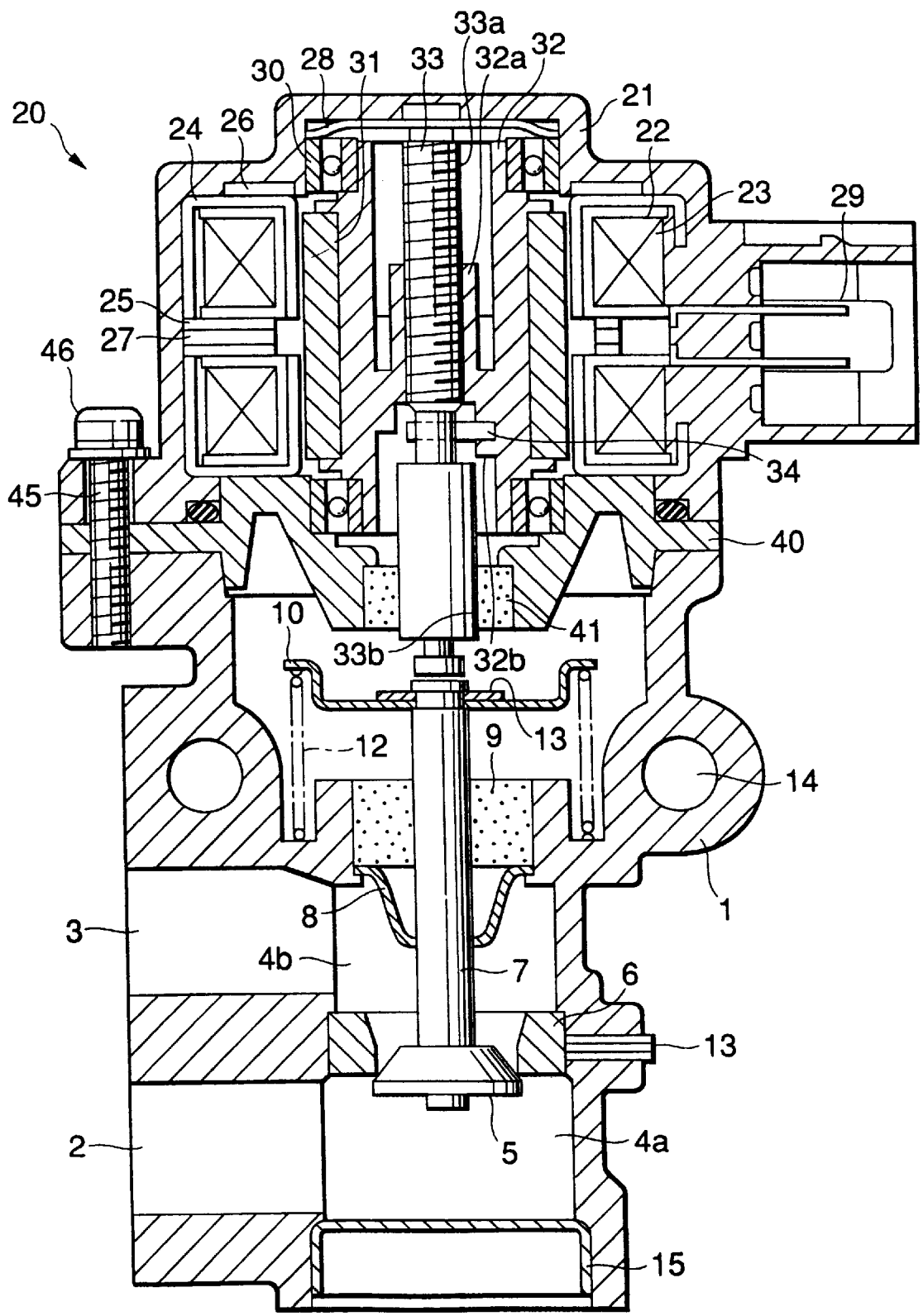
FIG. 10 is a sectional view of a conventional rotationreciprocation converting motor.
Figure 11:
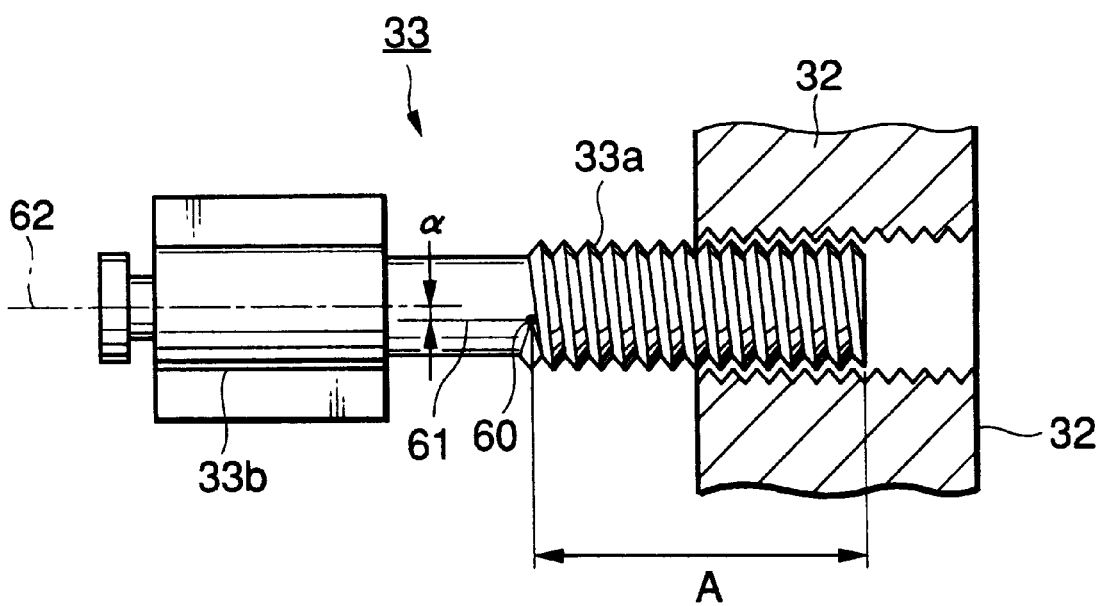
FIG. 11 is an explanatory diagram for a description of phases.

In FIG. 1, reference numerals 50 and 51 designate a stator; 31, a magnet; 32, a rotor; and 33, a motor shaft which comprises a threaded portion 33a which is engaged with the rotor 32, a flat-plate-shaped rotation regulating portion 33b, and a protrusion 33d extended from the end of the motor shaft. The rotation regulating portion 33b has an abutting portion 33c on its end on the side of the threaded portion. The abutting portion 33c abuts against the stopper portion 32b of the rotor 32, to regulate the axial movement of the motor shaft 33. The other arrangements are equal to those of FIG. 10.

The phases of those components are determined as follows: The phase of the stator 50 and 51 (its pawls shown in FIG. 1) is determined by suitably arranging ridges and recesses formed on the outer cylindrical surface of the stator so that the stator is in phase when assembled. The stator 50 and 51 and the motor housing 21 are set in phase with each other with the aid of the recesses (or holes) of the stator and the ridges which are formed in a metal mold so that the stator is constant in phase when the motor housing is molded. Next, the motor housing 21 and the motor holder 40 are fixed with the aid of a ridge-and-recess structure. The motor holder 40 and the motor bushing 41 are set by the rectangular configuration of the latter 41. On the other hand, the phase of the rotor 32 with respect to the magnet 31 is determined by a ridge-and-recess structure. The phases of the magnetic pole of the magnet 31, and the stopper 32*b* are determined, and the phase of the threaded portion 33*a* is also determined.

The phases of the components of the motor shaft 33 are also determined. The structure of the motor shaft 33 is as follows: That is, the motor shaft 33 has: the threaded portion 33*a*; and the flat-plate-shaped rotation regulating portion 33*b* which is extended from the threaded portion 33*a* on the motor output side. The end face of the rotation regulating portion 33 which is on the side of the threaded portion, is formed into the flat abutting portion which abuts against the stopper portion 32*b* of the rotor 32. Furthermore, the rotation regulating portion 33*b* has the protrusion 33*d* on the elongation of the threaded portion 33, which is a portion abutting against the valve. It is not always necessary that the rotation regulating portion 33*b* is in the form of a flat plate; that is, it may be freely shaped as long as it is able to regulate the rotation of the motor shaft.

The motor shaft 33 is formed by machining a round bar on one and the same machine. Hence, the positional relationships, i.e., the phases-of the threaded portion 33*a*, the rotation regulating portion 33*b*, and the abutting portion 33*c* are much higher than those of the conventional structure formed by press-fitting the stopper pin into the motor shaft. Hence, the motor of the invention is sufficiently high in the initializing characteristic that the synthetic phase affects the performance.

Second Embodiment

Another example of the rotation-reciprocation converting motor, which constitutes a second embodiment of the invention, will be described with reference to FIGS. 2 and 3.

The second embodiment is fundamentally equal in structure to the first embodiment; however, the second embodiment is different from the first embodiment in its motor shaft. FIG. 2 is a perspective view showing the motor shaft of the stepper motor. In FIG. 2, parts corresponding functionally to those already described with reference to the above-described conventional motor are therefore designated by the same reference numerals or characters.

Figure 2:
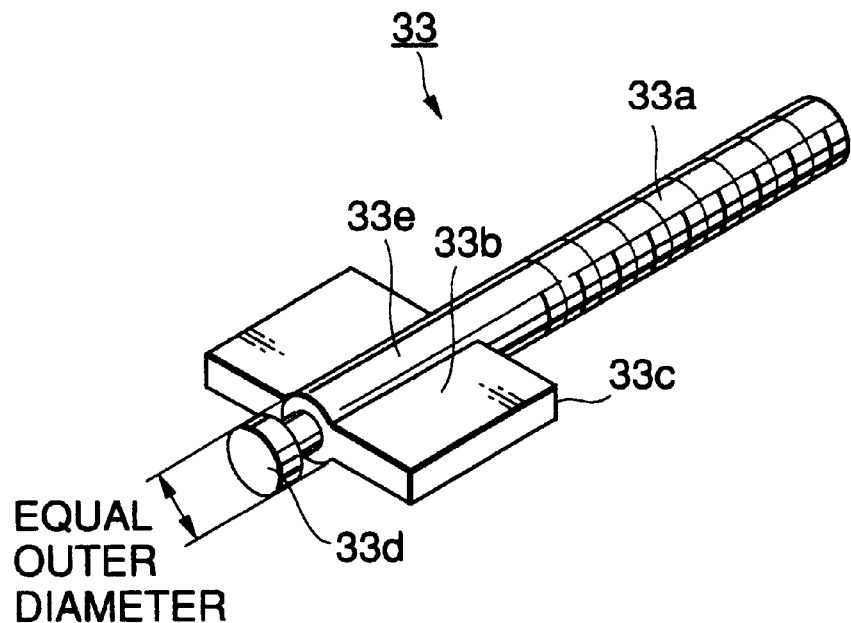
FIG. 2 is a perspective view showing a motor shaft of another example of the rotation-reciprocation converting motor, which constitutes a second embodiment of the invention.
Figure 3:
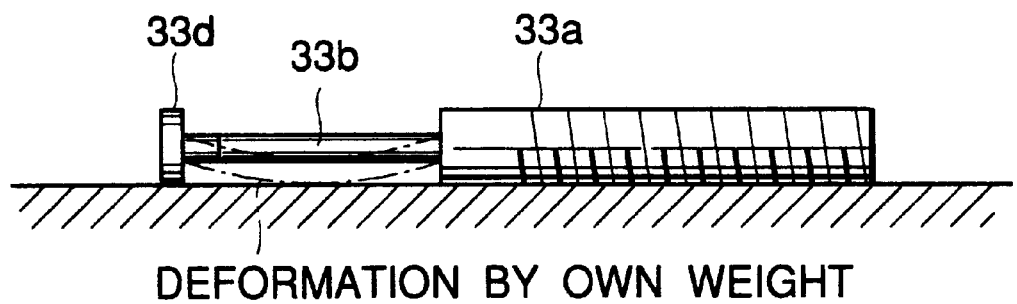
FIG. 3 is a diagram for a description of the operation of the motor shaft in the second embodiment of the invention.

In FIG. 2, reference numeral 33 is the aforementioned motor shaft of the second embodiment. The motor shaft 33 comprises a threaded portion 33*a*, a rotation regulating portion, and a protrusion 33*d*. One side portion of the rotating regulating portion 33*b*, which is on the threaded portion side, is a flat abutting portion 33*c* which is abutted against the stopper portion 32*b*. The rotation regulating portion 33*b* includes a core portion 33*e* which is equal in outside diameter to the threaded portion 33*a*. A pair of flat plate portions are extended from both right and left sides of the core portion 33*e*; however, the number of flat plate portions may be only one in practical use.

The motor shaft 33 is formed by metal injection molding. The threaded portion 33*a* is equal in outside diameter to the core portion 33*e*. The phases of the threaded portion 33*b* and the rotation regulating portion 33*b* are constant being determined by the metal mold. The metal injection molding method is practiced as follows: First, an injection molding operation is carried out with fine metal powder mixed with resin. Next, a resin removing operation is carried to remove the resin from the molding. Thereafter, the molding is sintered at high temperature. Thus, the motor shaft has been formed. The components of the motor shaft thus formed has the phases which have been determined by the metal mold. Hence, the components of the motor shaft are high in phase accuracy. Furthermore, it should be noted that the motor shaft can be mass-produced similarly as in the case where it is formed by molding. On the other hand, in the above-described sintering operation, the shaft is liable to be bent by its own weight. In order to overcome this difficulty, it is necessary for the rotation regulating portion 33*b* to have the core portion 33*e* along the central axis which is equal in outside diameter to the threaded portion. In other words, if the rotating regulating portion 33*b* has no core portion 33*e*, then as indicated by the one-dot chain lines in FIG. 3 the rotation regulating portion may be deformed. However, by allowing the rotation regulating portion to have the core portion in the above-described manner, the rotation regulating portion 33*b* is prevented from being deformed by its own weight.

Third Embodiment

Figure 4:
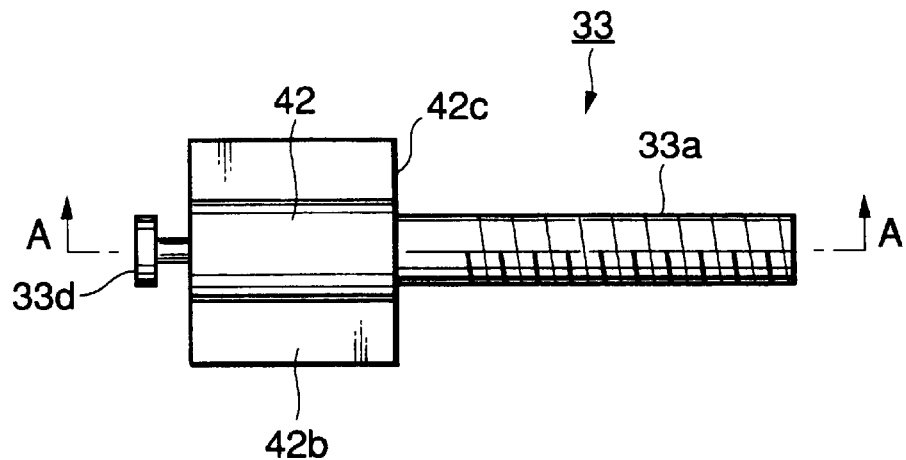
FIG. 4 is a plan view showing a motor shaft in another example of the rotation-reciprocation converting motor, which constitutes a third embodiment of the invention.
Figure 5:
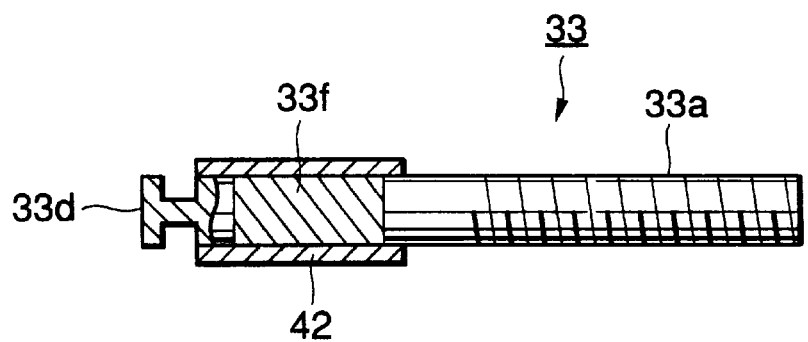
FIG. 5 is a sectional view taken along line A—A in FIG. 4.
Figure 6:
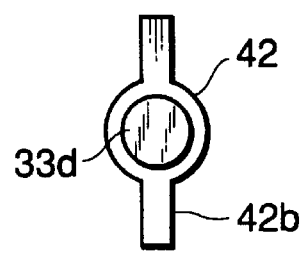
FIG. 6 is a side view of the motor shaft in the third embodiment.

A third embodiment of the invention will be described with reference to FIGS. 4 through 6. The third embodiment is equal in fundamental structure to the above-described first embodiment; that is, the third embodiment is different from the first embodiment in its motor shaft. FIGS. 4 through 6 show the motor shaft of a stepper motor. In those figures, parts corresponding functionally to those already described with reference to the above-described conventional rotation-reciprocation converting motor are therefore designated by the same reference numerals or characters. In FIGS. 4 through 6, reference numeral 33 designates the motor shaft in the third embodiment. The motor shaft 33 comprises: a threaded portion 33*a*; a protrusion 33*d* on the prolongation of the threaded portion 33*a* which is abutted against the valve; and a knurled portion 33*f* at the middle.

On the other hand, a rotation regulating portion 42 is formed as an individual component; that is, it is formed on the knurled portion 33*f* by resin insert molding. The rotation regulating portion 42 includes a flat plate portion 42*b*. The side of the flat plate portion 42*b*, which is on the threaded shaft side, is formed into an abutting portion 42*c* which is flat and is abutted against the stopper portion 32*b* of the rotor 32. The rotation regulating portion 42 is held on the motor shaft 33 in a non-rotating posture by the knurled portion 33*f*. The phases of the threaded portion 33*a* of the shaft 33 and the rotation regulating portion 42 are accurate, because the resin insert molding method is practiced after the phase of the threaded portion 33*a* has been determined by a threaded portion in the metal mold (or by a part of the threaded portion). As was described above, the shaft is formed by a metal plastic working method (or a rolling method), and the rotation regulating portion is formed by a molding method. Hence, the motor shaft can be produced on a large scale and at low manufacturing cost.

Fourth Embodiment

Figure 7:
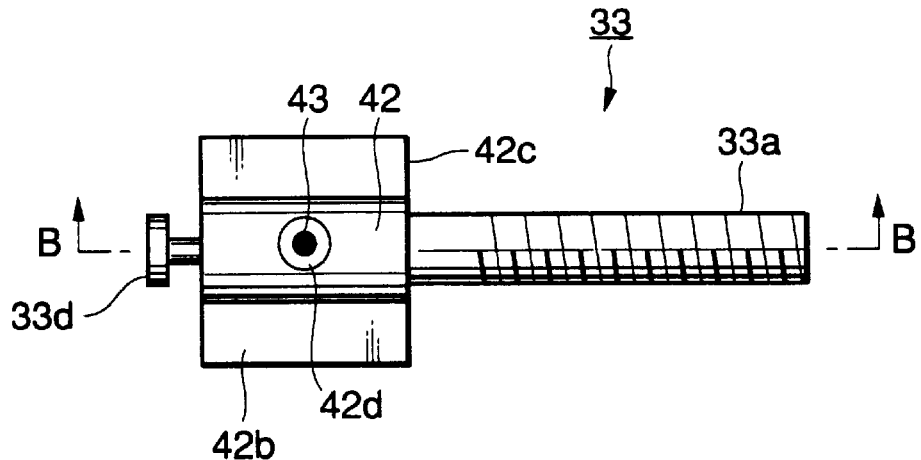
FIG. 7 is a plan view showing a motor shaft in another example of the rotation-reciprocation converting motor, which constitutes a fourth embodiment of the invention.
Figure 8:
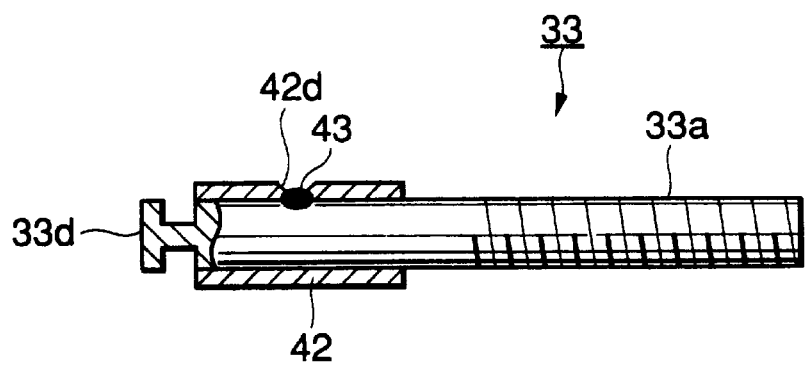
FIG. 8 is a sectional view taken along line B—B in FIG. 7.
Figure 9:
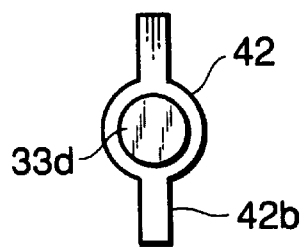
FIG. 9 is a side view of the motor shaft in the fourth embodiment of the invention.

A fourth embodiment of the invention will be described with reference to FIGS. 7 through 9. The fourth embodiment is equal in fundamental structure to the above-described first embodiment (FIG. 1); however, the fourth embodiment is different from the first embodiment in its motor shaft. In FIGS. 7 through 9, parts corresponding functionally to those already described with reference to the above-described conventional rotation-reciprocation converting motor are therefore designated by the same reference numerals or characters. In FIGS. 7 through 9, reference numeral 33 designates the motor shaft. The motor shaft 33 comprises: a threaded portion 33a, and a protrusion 33d extended on the elongation of the threaded portion 33a. The protrusion 33d is adapted to abut against the valve.

On the other hand, a rotation regulating portion 42 is formed by a metal injection molding method. The rotation regulating portion 42 includes a flat plate portion 42b. The side of the flat plate portion 42b, which is on the threaded shaft side, is formed into an abutting portion 42c which is flat and is abutted against the stopper portion 32b of the rotor 32. The rotation regulating portion 42 is held on the motor shaft 33 in a non-rotating posture as follows: The rotation regulating portion 42 has a hole 42d so that the former 42 is coupled to the shaft 33. That is, the rotation regulating portion 42 is welded to the shaft through the hole 42d as indicated at 43. The phases of the threaded portion 33a of the motor shaft 33, and of the rotation regulating portion 42 are accurate, because the phase of the rotation regulating portion 42 is fixed by welding after the phase of the threaded portion 33 has been determined according to the configuration of the thread (or a part of the configuration of the thread) with a jig used during welding. Furthermore, as was described above, the shaft is formed by a metal plastic working method (or a rolling method), and the rotation regulating portion is formed by a metal injection molding method. Hence, the motor shaft can be produced at low manufacturing cost. The fourth embodiment, unlike the third embodiment, has no resin portions. Hence, the motor shaft according to the fourth embodiment is high in heat resistance, and has the same effects or merits as the third embodiment.

As was described above, in the motor shaft, only the phases of threaded portion and the rotation regulating portion are determined; that is, the number of portions whose phases must be determined is only two. In addition, the work of press-fitting the roll pin is eliminated. Therefore, the phases can be readily determined with high accuracy. The abutting surface of the stopper portion is flat. This feature solves the problem that the phase is shifted by the wear of the abutting surface.

Instead of the cutting machining method, the metal injection molding method is employed for the manufacture of the motor shaft, and the motor shaft is so designed as to prevent the deformation of the motor shaft which may occur when the metal injection molding method is employed. Hence, the rotation-reciprocation converting motor of the invention is low in manufacturing cost and high in accuracy.

Furthermore, in the motor shaft of the invention, the threaded portion is formed by the rolling molding method, while the rotation regulating portion is made of resin, and in order to make the phases of the threaded portion and the rotation regulating portion of resin constant, the insert molding method is employed. Hence, the phases can be readily determined at low cost. In the case where the rotor is of resin, the abutting surfaces are of resin. In this case, those surfaces are substantially equal in hardness when abutted against each other. This feature markedly reduces the amount of abrasion, thus solving the problem that the phase is shafted by the abrasion.

On the other hand, the threaded portion of the motor shaft is formed by the metal plastic working method (or the rolling working method), while the rotation regulating portion is formed by the metal injection molding method, and the rotation regulating portion is welded to the threaded portion so that those components are constant in phase. Hence, the rotation-reciprocation converting motor of the invention can be readily produced on a large scale, and can be used in a high temperature atmosphere.

What is claimed is:

1. A rotation-reciprocation converting motor comprising:

a rotor which is rotatable in a forward direction and in a reverse direction, a rotational position determining stopper portion being formed at an end of said rotor; and a motor shaft and a bushing, said motor shaft being slidably guided by said bushing, and said motor shaft being threadably engaged with said rotor to convert the rotating motion of said rotor into a reciprocating motion; said motor shaft including:

a threaded portion which is engaged with said rotor; and a rotation regulating portion which is slidably guided by said bushing and formed integrally with said threaded portion, said rotation regulating portion having an abutting portion which is abutted against said rotational position determining stopper portion when said motor shaft is moved to a predetermined position in a direction in which said motor shaft reciprocates, wherein said motor shaft is formed by a metal injection molding method, and said rotation regulating portion includes a core portion that extends to said threaded portion, said core portion having a diameter along an entire length thereof that is equal to an outside diameter of said threaded portion.

2. A rotation-reciprocation converting motor as claimed in claim 1, wherein said abutting portion comprises a flat surface and said rotational position determining stopper portion comprises another flat surface, wherein said flat surface abuts said another flat surface when said motor shaft is moved to said predetermined position.

* * * * *